(12) United States Patent
Coatney et al.

(10) Patent No.: US 7,734,836 B2
(45) Date of Patent: Jun. 8, 2010

(54) METHOD AND APPARATUS FOR DYNAMICALLY QUALIFYING MASS STORAGE DEVICES

(76) Inventors: Douglas W. Coatney, 495 E. Java Dr., Sunnyvale, CA (US) 94089; Rajesh Ananthanarayanan, 495 E. Java Dr., Sunnyvale, CA (US) 94089

( * ) Notice: Subject to any disclaimer, the term of this patent is extended or adjusted under 35 U.S.C. 154(b) by 139 days.

(21) Appl. No.: 11/546,733

(22) Filed: Oct. 11, 2006

(65) Prior Publication Data
US 2008/0162677 A1 Jul. 3, 2008

(51) Int. Cl.
*G06F 3/00* (2006.01)
*G06F 3/023* (2006.01)
*G06F 12/00* (2006.01)

(52) U.S. Cl. .............................. 710/10; 710/8; 707/200
(58) Field of Classification Search .................. 710/10, 710/8; 707/200
See application file for complete search history.

(56) References Cited

U.S. PATENT DOCUMENTS

| | | | |
|---|---|---|---|
| 6,425,053 B1 | 7/2002 | Considine et al. | |
| 6,711,574 B1 * | 3/2004 | Todd et al. | 707/100 |
| 6,735,650 B1 * | 5/2004 | Rothberg | 710/74 |
| 6,875,109 B2 * | 4/2005 | Stockdale | 463/29 |
| 7,062,398 B1 * | 6/2006 | Rothberg | 702/115 |
| 7,159,065 B1 * | 1/2007 | Marlatt | 710/313 |
| 2002/0156944 A1 * | 10/2002 | Benhase et al. | 710/8 |
| 2003/0204701 A1 | 10/2003 | Mimatsu | |
| 2004/0030923 A1 * | 2/2004 | Tindal et al. | 713/201 |
| 2004/0111485 A1 | 6/2004 | Mimatsu | |
| 2005/0120163 A1 * | 6/2005 | Chou et al. | 711/103 |
| 2005/0229021 A1 * | 10/2005 | Lubbers et al. | 714/2 |
| 2006/0031435 A1 * | 2/2006 | Tindal | 709/220 |
| 2006/0143543 A1 * | 6/2006 | Mandrell et al. | 714/43 |
| 2006/0184730 A1 | 8/2006 | Brown et al. | |

FOREIGN PATENT DOCUMENTS

| | | |
|---|---|---|
| EP | 1 357 465 A | 10/2003 |
| EP | 1 696 308 A | 8/2006 |
| WO | WO 2004/003783 A | 1/2004 |

* cited by examiner

*Primary Examiner*—Henry W. H. Tsai
*Assistant Examiner*—Hyun Nam
(74) *Attorney, Agent, or Firm*—Blakely, Sokoloff, Taylor & Zafman LLP

(57) ABSTRACT

A field-upgradeable database that is separable from system software contains information about mass storage devices that may be present in a storage array. When an uninitialized device is detected in the array, the field-upgradeable database is consulted to discover which non-standard functions the device supports, and one of the non-standard functions is activated. Software and systems using the field-upgradeable database in a storage server configuration are also described and claimed.

8 Claims, 5 Drawing Sheets

```
/* ------------------------------------------
 * Mass Storage Device Qualifications
 *
 *     vendor      product         revision
 *       id        string
 *     Check?
 *     Flags
 *     Zeroing time(s)
 *     Sector Size
 *     Verify Size
 *     RPM
 *     Last Block
 */
{
    "SEAGATE ", "ST12400N       ", "9072",
    0,
    0,
    UNKNOWN_ZERO,
    512,
    0,
    K10,
    TWO_GIG
},
{
    "SEAGATE ", "ST12550N       ", "0013",
    0,
    0,
    UNKNOWN_ZERO,
    512,
    0,
    K10,
    TWO_GIG
},
{
    "NETAPP  ", "X234_ST336704FC ", "NA42",
    1,
    QDC_FAST_MP_SW_VFY_FUA,
    1500,
    520,
    128,
    K10,
    GIG34
}
```

Fig. 5

METHOD AND APPARATUS FOR DYNAMICALLY QUALIFYING MASS STORAGE DEVICES

FIELD

The invention relates to storage server operations. More specifically, the invention relates to methods for identifying and exploiting mass storage device capabilities.

BACKGROUND

Data processing systems are often used to generate, manipulate or display large amounts of data. Subsystems to store data reliably and read or write data quickly are an important part of the overall system. In some applications, a dedicated storage server (which may be a file server or other type of data server) such as the Fiber-Attached Storage ("FAS") line of servers produced by Network Appliance, Incorporated of Sunnyvale, California, can provide economical data storage through a convenient, network-accessible interface. Other data processing systems may store data on one or more mass storage devices, such as hard disk drives, that are connected directly to the system through a peripheral interface (and not to a separate storage server which is accessed through a data communication network).

In either configuration, the mass storage devices that actually contain the user data must provide a basic set of functions for the system to use. For example, "read" functionality is essential, and "write" functionality is common (though there are read-only devices as well). Other basic functions may also be required for a device to comply with the specification of the peripheral interface through which the device communicates with the system. Commonly-used interfaces include Integrated Device Electronics ("IDE"), Small Computer Systems Interface ("SCSI"), Serial Advanced Technology Attachment ("SATA"), and Fiber Channel ("FC"). In addition to "read" and "write" functions, most peripheral device interfaces permit the host system to query attached devices to discover their type, size, and other identifying information.

Some mass storage device manufacturers augment the basic or minimum functional set required to comply with a peripheral interface specification by adding functions to improve the speed, capacity, or other characteristics of the storage device. For example, a hard disk may be able to write all-zero data to specified sectors autonomously, without requiring the all-zero data bytes to be transferred from the system's memory (this is called a fast-zero write function). This function reduces the system support required by the disk to clear sectors to zero, so the system can apply its resources to perform more useful work. With respect to interface definitions that do not define such a function (IDE and SATA), fast-zero writing is a non-standard capability. A system that relied on the presence of fast-zero writing capability might operate incorrectly if a device without that capability was connected.

Non-standard capabilities are different from functions that are merely optional: optional functions are defined by the interface specification but need not be implemented in a device to meet the specification. Non-standard functions are generally manufacturer-specific and may change or be removed from hardware revision to revision. Non-standard functions are usually accessed through an extension command mechanism defined in the peripheral interface specification. A "non-standard function" is therefore defined herein as a function of a mass storage device that is not characterized as either required or optional in an interface specification describing the interface between the mass storage device and its host system. It is appreciated that some functions may be non-standard with respect to one peripheral interface standard, but be required or optional with respect to a different peripheral interface standard.

Examples of non-standard functions with respect to at least one peripheral interface standard include:
  Self-test
    Device can perform a self-test operation and report the results (often in a manufacturer-dependent format)
  Failure analysis data storage function
    If a hard (unrecoverable) or soft (recoverable) error is encountered, device stores operating condition information for post-mortem analysis
  Zone checksum
    Device can calculate a checksum, cryptographic hash or similar verification value over a range of data bytes or sectors
  Extended Queue
    Device can accept a larger-than-standard number of pending operations in its command queue
  Firmware Download
    Device operation can be adjusted by downloading different firmware Non-standard features are sometimes added by a manufacturer to address a need of a large consumer of storage devices. For example, a firm that produces high-capacity storage servers may obtain devices that implement a special function that helps the storage server operate better. These devices may be readily available when the server is manufactured, but may be scarce or expensive some time later, when a purchaser of the server wishes to replace a failed device or expand the server's capacity by adding new devices. Furthermore, between the server's original manufacture and the date of an attempted upgrade, different sets of non-standard features may have been implemented on storage devices, some of which are unknown to system software controlling the operation of the data processing system or storage server.

Methods of dynamically determining what non-standard features are available on a newly-detected mass storage device and adjusting system operation to take advantage of the device's capabilities may be useful in this field.

SUMMARY

Embodiments of the invention detect an uninitialized mass storage device connected to a system and obtain an identifier of the device. Then, they retrieve a corresponding device descriptor from a field-upgradeable database that is separable from the system software, the descriptor to indicate which non-standard functions are available. Finally, one of the available non-standard functions is activated.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 5 shows a format for a field-upgradeable mass storage device qualification database.

DETAILED DESCRIPTION

Figure 1:
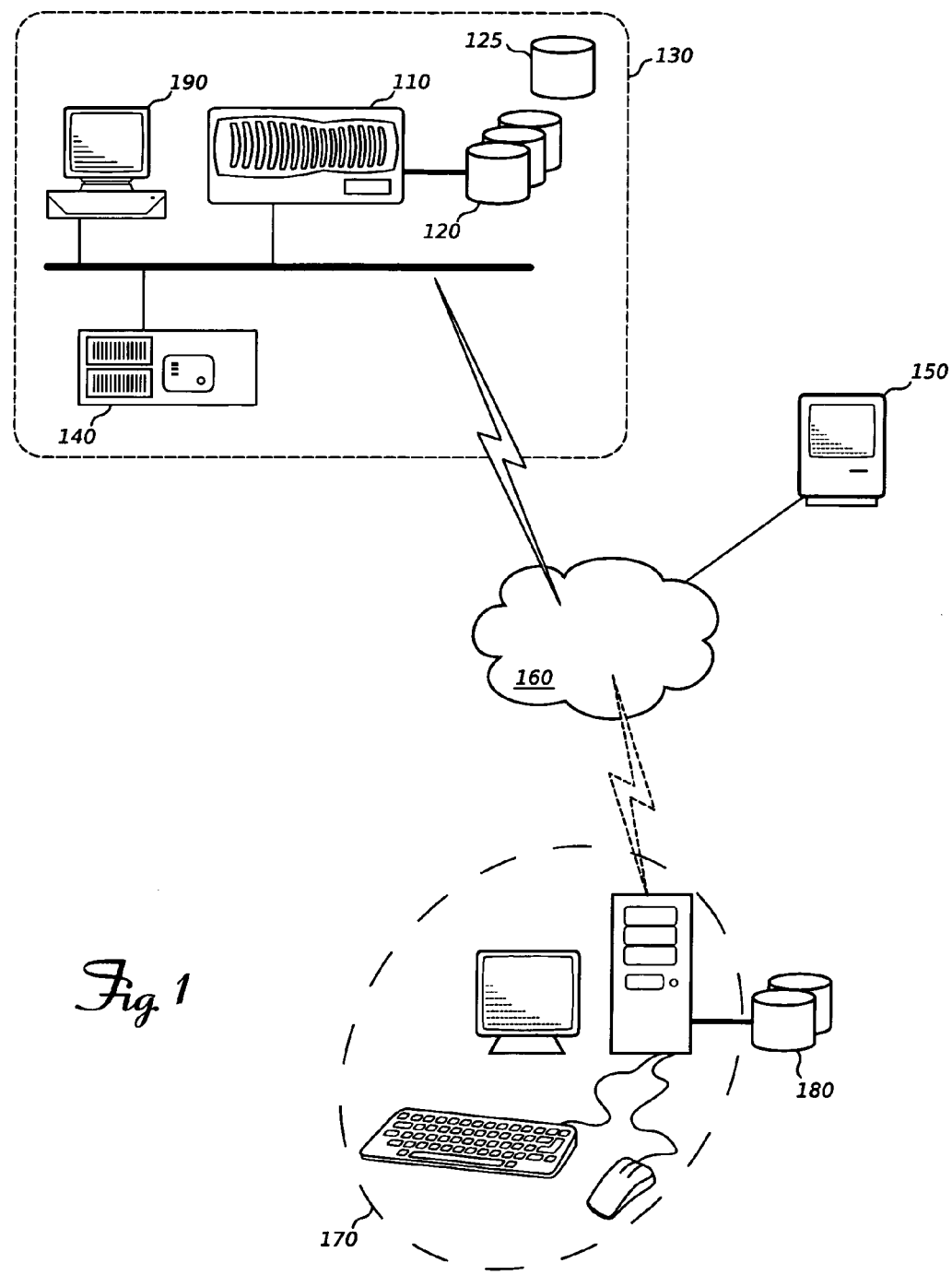
FIG. 1 shows a processing environment including several systems that can implement embodiments of the invention.

FIG. 1 shows a distributed data processing environment in which an embodiment of the invention may usefully be deployed. Element 110 is a data processing system configured as a storage server (e.g., a fileserver or a block-level storage server). Storage server 110 stores user data on a group of mass storage devices 120. Mass storage devices 120 may be operated as a Redundant Array of Independent Disks ("RAID") to obtain improved data storage and retrieval speeds and/or fault tolerance. Storage device 125 is an uninitialized mass storage device that is to be added to the group of mass storage devices 120, for example to replace a failed device or to increase the capacity of the group. Storage server 110 is located in a data center 130 and provides data storage facilities for other computers such as a web server 140 and a remote client 150. Communication with remote clients can occur over a distributed data network 160 such as the Internet.

Embodiments of the invention can also be used in a stand-alone computer system 170, which is connected to a plurality of mass storage devices 180 and may or may not be connected to a distributed data network. Computer system 190 may be provided in data center 130 to monitor and administer other computers and devices.

Figure 2:
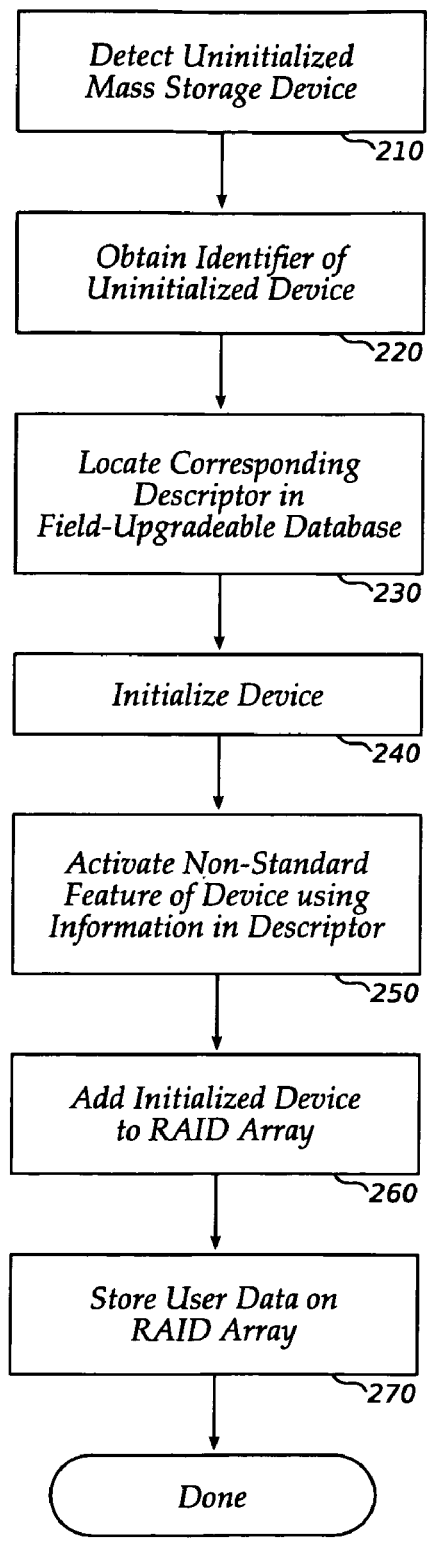
FIG. 2 outlines operations according to an embodiment of the invention.

FIG. 2 outlines the operations of a data processing system such as storage server 110 or stand-alone system 170 in FIG. 1 that implements an embodiment of the invention. First, the system detects an uninitialized mass storage device (e.g. device 125 in FIG. 1) connected through a peripheral interface (210) by, for example, enumerating the devices attached to the peripheral interface bus and inspecting each to see whether it has been initialized, by comparing a list of devices found to a list of devices expected, or another well-known conventional technique. An identifier of the device is obtained (220) by querying the device through a mechanism defined by the interface specification for the interface between the mass storage device and the host data processing system, by requesting that an operator of the data processing system enter the identifier (system operators not shown in FIG. 1), or through some similar process.

Next, a field-upgradeable database of device descriptors is searched to find a descriptor corresponding to the identifier (230). The field-upgradeable database may be stored locally on the data processing system or retrieved from a remote location over a network when needed. The field-upgradeable-database can be replaced with a new version containing additional or corrected entries separately from the system's controlling software (shown as element 315 in FIG. 3), or individual entries can be added, changed or removed, without affecting system operation. (In contrast, some prior-art systems embedded the database into the operating system software, so entries could not be added or changed separately from the system software.) Entries (also called "device descriptors") in the field-upgradeable database describe the features and characteristics of various different types of mass storage devices, including indicating the availability of non-standard features and providing any information necessary to use those features. This information may be used to initialize an operational data structure containing parameters and handling flags to control the system's usage of any non-standard features offered by the uninitialized mass storage device. In some embodiments, a hardware device driver (e.g. element 435 in FIG. 4) detects the uninitialized device and prepares an operational data structure containing default or "lowest common denominator" values that will work with any device. If non-standard features are detected after searching the field-upgradeable database, and the operational data structure is modified, lower-level subsystems such as the hardware device driver (FIG. 4, 435) or RAID control logic (FIG. 4, 422) may need to be notified to re-synchronize their internal state to reflect the device's newly-discovered capabilities. In some embodiments, the field-upgradeable database may contain additional information to indicate which subsystems need to be notified.

Next, the uninitialized device is initialized (240) using procedures appropriate for the device (for example, some peripheral interface specifications include a "format" command to initialize a mass storage device), and finally, using the information in the device descriptor, the system activates a non-standard feature of the mass storage device (250). Once the device is initialized, it may be added to a RAID array (260) and used to store user data (270).

Some of these operations may be performed in a different order than that set forth above. For example, a non-standard feature (such as a fast write zero function) may be useful in performing the initialization operation, and some embodiments may initialize the device before obtaining the identifier and looking up the corresponding device descriptor. Once the device is initialized, it may be unnecessary to refer to the field-upgradeable database for information about the device; instead, the information may be stored in a special area on the device itself. For example, the information may be stored in the first sector(s) of the device, the last sector(s) of the device, or in some other area that is not normally used to store user data. However, systems implementing other embodiments may refer to the database whenever information about the device (including what non-standard features it offers) is required. Thus, obtaining an identifier of the device (220), lookup of device capabilities (230) and activation of non-standard features (250) need not be tied to the initialization of an uninitialized device.

Figure 3:
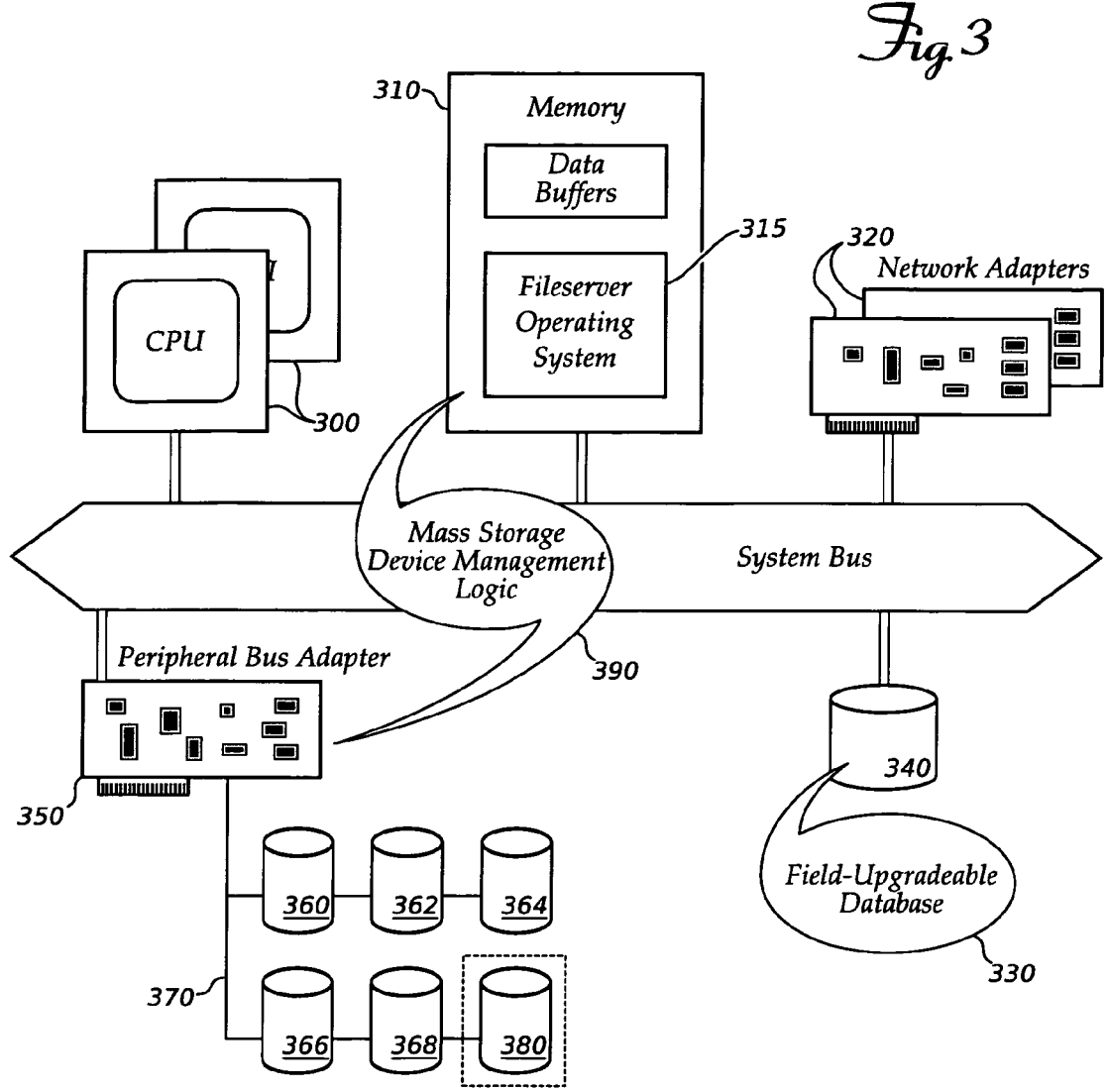
FIG. 3 shows subsystems and components contained in a system implementing an embodiment of the invention.

FIG. 3 is a block diagram of subsystems and components that may be found in a data processing system (e.g. system 110 or 170 in FIG. 1) that incorporates an embodiment of the invention. Elements 300 are central processing units ("CPUs") that coordinate and direct the operations of other components, under the control of software instructions stored in memory 310. Network adapters 320 permit the system to communicate with other data processing systems over a network like distributed data network 160 shown in FIG. 1. CPUs 300 can examine and obtain information from field-upgradeable configuration database 330, which may be stored on a hard disk 340, in a non-volatile memory such as a flash memory, or received from another system over the network (the latter alternate locations are not shown in this figure). In embodiments where the field-upgradeable configuration database is received over the network, it may be received from the manufacturer of the data processing system, from the manufacturer of one of the mass storage devices (discussed below), from an industry consortium or standards group, or from some other person or group that is willing to provide such data.

A peripheral bus adapter 350 permits the CPUs to interact with mass storage devices 360, 362, 364, 366 and 368, which are connected to an expandable peripheral bus 370. The bus is "expandable" in the sense that additional mass storage devices (and possibly other types of devices) may be attached to it. For example, in this figure, uninitialized mass storage device 380 has just been attached to expandable peripheral bus 370. Appropriate peripheral buses in common use include the Small Computer Systems Interface ("SCSI") bus, the Integrated Device Electronics ("IDE") bus, the Serial Advanced Technology Attachment ("SATA") bus, and the Fiber Channel ("FC") bus. Mass storage devices designed to connect to these (and other) buses are often called "SCSI disks," "IDE disks," "SATA disks," and so on.

Logic to manage mass storage devices 360-368 is shown in this figure as element 390. The logic may be implemented by software instructions contained in memory 310, by special-purpose circuitry incorporated in peripheral bus adapter 350, or by special-purpose circuitry and/or software located elsewhere in the system. Mass storage device management logic 390 performs some of the operations according to an embodiment of the invention as described earlier. For example, management logic 390 may detect that uninitialized device 380 has been connected to expandable peripheral bus 370, obtain its identifier and locate a corresponding device descriptor in field-upgradeable configuration database 330, and initialize the device, possibly employing non-standard functions that are indicated as available in the device descriptor. Mass storage device management may entail operating the devices as a Redundant Array of Independent Disks ("RAID") according to principles and techniques familiar to those of skill in the relevant arts.

Embodiments of the invention can be used on systems having more or fewer of the elements shown in FIG. 3. For example, single-processor systems, systems with only one network adapter (or even without a network adapter), systems with several independent expandable peripheral buses, and even systems with only a single, uninitialized mass storage device, can benefit from the dynamic mass storage device qualification permitted by operations involving the field-upgradeable configuration database. The one or more mass storage devices need not be operated as a RAID array; embodiments of the invention can be used even if the storage devices are used in "Just a Bunch Of Disks" ("JBOD") mode.

Figure 4:
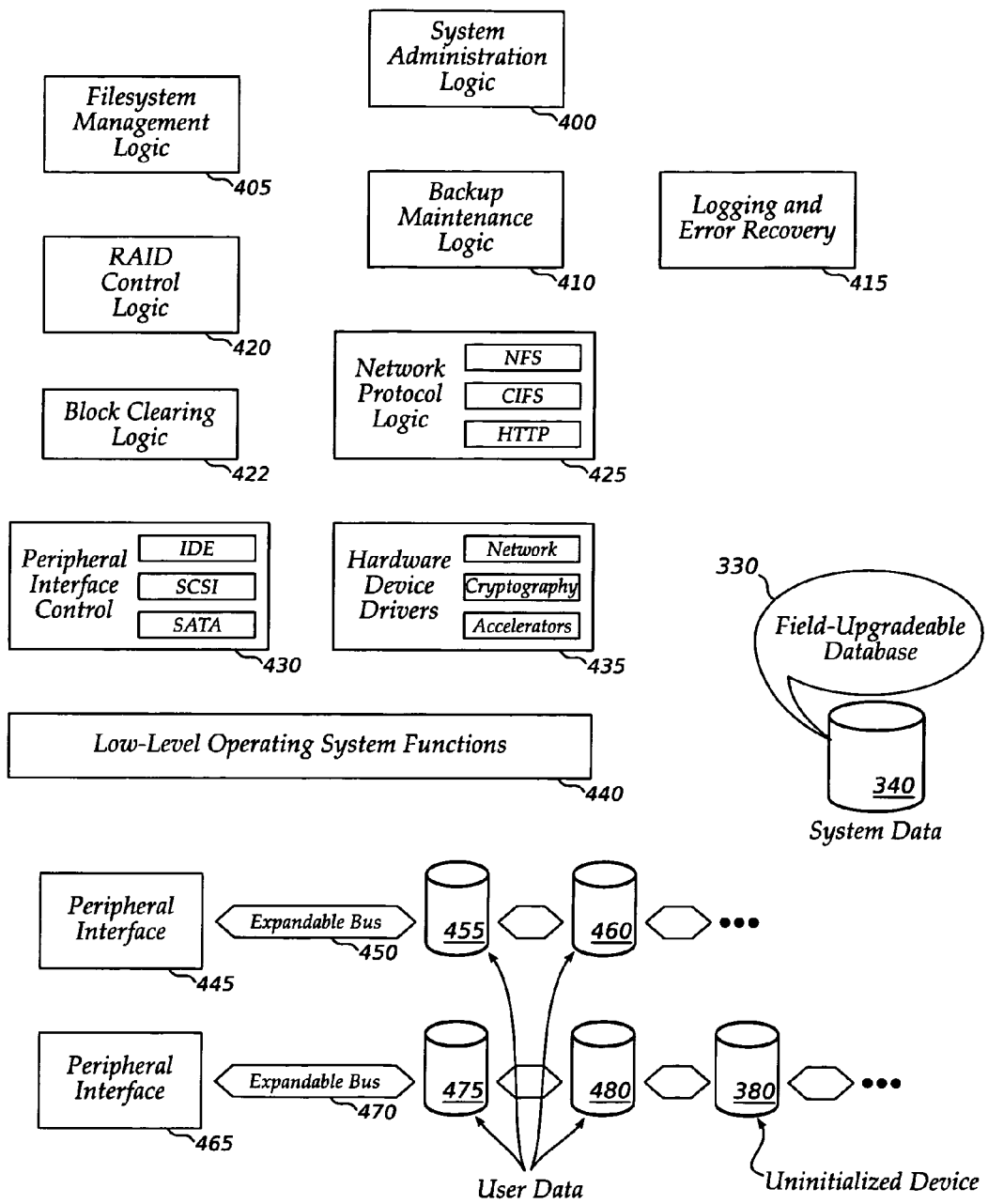
FIG. 4 shows a more-detailed view of logical subsystems of a storage server that contains an embodiment of the invention.

FIG. 4 shows a more detailed component diagram of a storage server like server 110 and mass storage devices 120 shown in FIG. 1 that contains an embodiment of the invention. At the highest level, system administration logic 400 coordinates the operation of various other components of the storage server. Filesystem management logic 405 allocates storage space available on mass storage devices connected to the system and responds to requests to create, rename, delete, read and write files and directories. Backup maintenance logic 410 provides functions to store and recover data stored on mass storage devices 455, 460, 475 and 480 against possible hardware, software or operational errors, and logging & error recovery logic 415 collects data to assist in various forensic and optimization tasks.

RAID control logic 420 arranges underlying storage on mass storage devices to provide resilience against device failure. Filesystem management logic 405 and/or RAID control logic 420 may use lower-level block-clearing logic 422 to erase one or more blocks of a mass storage device; block clearing logic 422 may in turn use a non-standard fast write zero function to accelerate this operation if the mass storage device provides such a function.

Network protocol logic 425 interacts with clients (not shown in FIG. 4) of the storage server according to standard data access protocols such as the Network File System ("NFS"), Common Internet File System ("CIFS"), Hypertext Transfer Protocol ("HTTP"), and so on. Peripheral interface control logic 430 provides functions to interact with mass storage (and other) devices connected to expandable peripheral buses 450 and 470. Hardware device drivers 435 control and interact with other hardware devices, such as network interfaces, cryptographic processors, and other function accelerators. Low level operating system functions 440 help control and coordinate the operation of other hardware and software modules by handling interrupts, direct memory access ("DMA") transfers, et cetera.

Peripheral interfaces 445 and 465 translate signaling levels and implement peripheral protocols to permit the system to communicate over expandable buses 450 and 470 with mass storage devices 455, 460, 475 and 480. These storage devices (which may be operated together as a RAID under the control of RAID control logic 420) contain user data. In contrast, mass storage device 340 contains system data such as software instructions to implement some of the previously-described logic modules, logging data, and the field-upgradeable configuration database 330 according to an embodiment of the invention.

FIG. 4 also shows uninitialized device 380 which has recently been attached to expandable bus 470, and which will be detected, initialized and used by the storage server as described above.

FIG. 5 shows a sample format of a field-upgradeable configuration database such as mentioned above, according to one embodiment of the invention. The format shown here is structured plain text and will be familiar to those of ordinary skill in the art. A comment syntax is provided so that human readable information 500 can be embedded in the file. Entries 505 are curly-brace ("{ }") delimited and separated by commas; each entry contains several comma-separated values 510-555. Values include a vendor identification ("ID") string 510, a product string 515 and a revision string 520. Together, these strings identify a particular type of mass storage device. Other values appear in the file as textual representations of integers and/or constants, in a style familiar to those of skill in the relevant arts. They will be described here in terms of their logical meanings, notwithstanding that the textual representations are not precisely congruent with these meanings. For example, Boolean "check" value 525 indicates whether the embodiment should issue a warning or informational message if the mass storage device reports a firmware version different than a corresponding value in the database. In the sample file of FIG. 5, Boolean check value 525 appears as an integer "0", which indicates "false." A "flags" entry 530 provides Boolean values to indicate which non-standard features (if any) the mass storage device offers. "Zeroing time" entry 535 permits the system to streamline its operations when writing zeros to a block by preparing a better prediction of the amount of time it will take to complete the write operation. Sector size entry 540 provides the size (in bytes) of data sectors of the drive, and verify size entry 545 specifies a number of blocks of the storage device that will be scanned as part of a background media scan to detect media errors. Revolutions per minute ("RPM") field 550 describes the mass storage device's rotational speed, and "last block" entry 555 provides the integer index of the last useable data block of the device.

Many of the data fields shown in this example are filled with mnemonic identifiers that stand in for numeric values. This feature permits easier hand administration: an operator can edit the file and add, change or replace entries without a complex software tool. Some configuration file formats may allow executable or "script" values that can interrogate a device dynamically, or binary values that may be sent to the mass storage device to cause it to operate in a desired manner.

Other configuration database formats are also possible. For example, an Extensible Markup Language ("XML") database is still text-based, so it can be edited by hand if necessary, but the hierarchical structure of XML files simplifies machine processing. Field-upgradeable databases can also be structured as binary (non-text) files that are not easily manipulated by hand, but that may be smaller, more secure, or more easily processed by machine. System administration logic may permit mass storage device descriptors in any of these database formats to be added, updated, or deleted.

An embodiment of the invention may be a machine-readable medium having stored thereon instructions which cause a programmable processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that dynamic mass storage device qualification can also be performed by software and hardware that distribute the functions of embodiments of this invention differently than herein described. Such variations and implementations are understood to be captured according to the following claims.

We claim:

1. A method for providing information about availability of non-standard functions of a mass storage device in a storage server, comprising:

initializing, in the storage server, an operational data structure with a set of default values for operating a standard mass storage device;

obtaining an identifier of a mass storage device;

retrieving, from a field-upgradeable database, a device descriptor corresponding to the identifier to identify availability of a non-standard function of the mass storage device, wherein the device descriptor is stored on the mass storage device and indicates availability of a non-standard function of the mass storage device;

in response to identifying the availability of the non-standard function, updating, by the storage server, the set of default values in the operational data structure to include values for activating the non-standard function of the mass storage device;

activating the non-standard function of the mass storage device; and notifying a subsystem of the storage server about the non-standard function, wherein the field-upgradeable database contains information that indicates the subsystem is to be notified.

2. The method of claim 1 wherein the mass storage device is an uninitialized mass storage device, the method further comprising:

initializing the uninitialized mass storage device to convert the mass storage device to an initialized mass storage device.

3. The method of claim 2, further comprising:

inserting the initialized mass storage device into an array of mass storage devices, the array configured as a Redundant Array of Independent Disks ("RAID").

4. The method of claim 1 wherein the identifier indicates a vendor and a product model of the mass storage device.

5. The method of claim 1 wherein the non-standard function is one of a fast write zero function, a drive self-test function, a failure analysis data storage function or a zone checksum function.

6. A storage server comprising:

an expandable bus to accept an uninitialized mass storage device having an identifier;

management logic to obtain the identifier, wherein the identifier corresponds to a device descriptor stored on the mass storage device, the device descriptor indicating whether a mass storage device having the identifier can perform a fast write zero function;

a hardware device driver configured to initialize an operational data structure with a set of default values for operating a standard mass storage device, wherein the hardware device driver is further configured to update the set of default values in the operational data structure to contain values for activating the fast write zero function and to notify a subsystem of the storage server about the fast write zero function, wherein the device descriptor contains information that indicates the subsystem is to be notified;

Redundant Array of Independent Disks ("RAID") logic to initialize the uninitialized mass storage device and insert the initialized device into a RAID array; and block clearing logic to erase information on the initialized device; wherein the block clearing logic uses a fast write zero function of the initialized device to erase the information if the device descriptor indicates that the initialized device can perform a fast write zero function.

7. The storage server of claim 6 wherein the device descriptor is stored in a text file.

8. The storage server of claim 6 wherein the device descriptor is stored in a binary file.

* * * * *